May 2, 1961     H. E. M. HEINEMANS     2,982,483
ELECTRIC COFFEE MILL
Filed Sept. 3, 1958
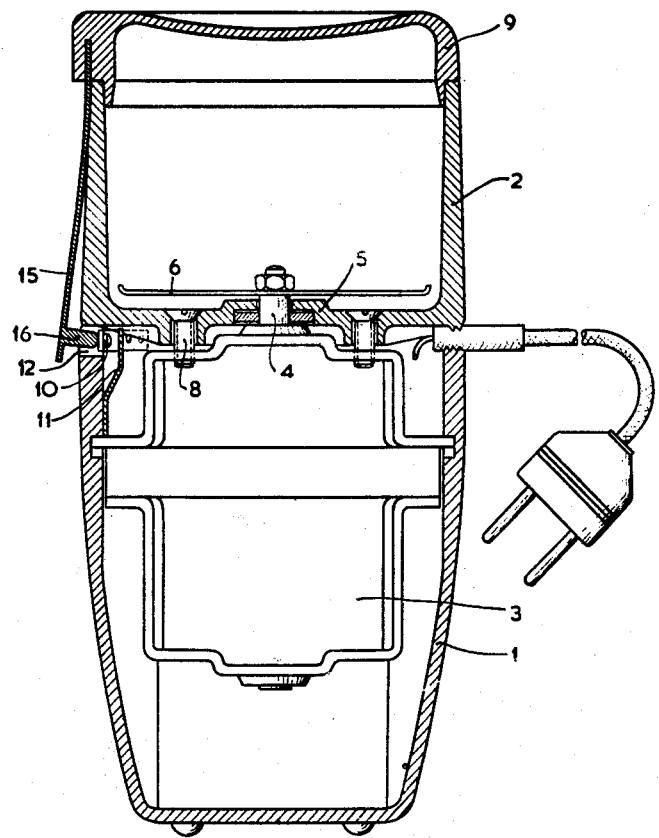
INVENTOR
HENRICUS E. M. HEINEMANS
BY
AGENT United States Patent Office 2,982,483
Patented May 2, 1961

2,982,483
ELECTRIC COFFEE MILL

Henricus Egbert Maria Heinemans, Eindhoven, Netherlands, assignor to North American Philips Company Inc., New York, N.Y., a corporation of Delaware Filed Sept. 3, 1958, Ser. No. 758,715

Claims priority, application Netherlands Sept. 23, 1957

2 Claims. (Cl. 241—100)

This invention relates to electric coffee mills comprising a housing containing an electric motor and a container adapted to be closed by a cover, a rotary beater knife arranged in the container being coupled to the electric motor and a press contact switch in circuit with the electric motor being provided for switching on the motor.

If the press contact switch is on the outer wall of the housing, the disadvantage is involved that it is possible to switch on the electric motor with the cover not deposited on the container, the rapidly-rotating beater knife thus being apt to cut and injure the operator.

In French patent specification No. 1,106,248 there is described a coffee mill in which a countersunk press contact is provided in the upper side of the housing, its cover being a stud which, in the closed position of the cover, bears on the press contact switch and closes the same.

Said device has the disadvantage that a second press contact switch is required if it is to be avoided that the electric motor is always switched on only when the cover is closed.

An object of the invention is to provide a simple construction of a coffee mill, in which the circuit of the motor can be completed only in the closed position of the cover, but in which the circuit is not completed by merely closing the cover. For completing the circuit a separate manipulation is required.

According to the invention, the press contact switch is countersunk in the side wall of the housing, while the cover has a resilient tongue provided with a stud, which stud is in front of the press contact switch when the cover is closed, but is adapted by pressing to engage in the countersunk part of the wall so deeply that the press contact switch is closed.

The term "countersunk press contact" switch is to be understood in this case to mean a press contact switch countersunk in the wall to an extent such that it cannot be operated by hand.

In order that the invention may be readily carried into effect, one embodiment will now be described, by way of example, with reference to the accompanying drawing showing a vertical diagrammatic cross-section of a coffee mill.

The mill comprises a housing constituted by two parts 1 and 2, which may consist of moulded or extruded material. The lower part 1 contains an electric motor 3 having a vertical shaft 4, which extends through the bottom 5 of the upper part 2 of the housing. This part constitutes the container in which the coffee can be ground.

For this purpose a beater knife 6 is secured to the shaft 4. The upper part of the housing or container 2 is secured by means of screws 8 to the lower part and may be closed by a cover 9. The supply lead (not shown) for the electric motor includes two contacts 10 and 11 provided behind an opening or countersunk part 12 of the housing. When the contact 10 is depressed sufficiently to engage the contact 11, the circuit is completed. The opening 12 has been chosen so small that the press contact switch cannot be operated with a finger.

Secured to the cover 9 is a resilient tongue 15 carrying a stud 16 which is adapted to protrude in the opening or countersunk part 12. For this purpose it may be necessary for the cover, after being deposited on the container, to be turned into the correct position. By pressing now the tongue 15, it is possible to operate the press contact switch.

This construction provides in a simple manner a protection similar to that of known coffee mills and it is also avoided that the electric motor is always switched on in the closed position of the cover. It is thus possible to keep coffee, which may be ground, if desired, in the mill without the aroma being lost.

What is claimed is:

1. An electric mill for coffee or the like comprising a housing being provided with an electric motor and having an aperture therethrough of small diameter, a container secured to said housing, a cover for said container, a rotary beater knife in said container and coupled to said motor, a press contact switch in said housing in circuit with said motor for operating the same, the contacting elements of the switch being located on the inside of said housing and in line with said aperture in the housing, and a resilient tongue attached to said cover and having a transverse stud means aligned with said aperture when said cover is in fully closed position on said container whereby depression of said tongue causes said stud to engage and close said contact switch.

2. An electric mill for coffee or the like comprising a housing being provided with an electric motor and having an aperture therethrough of small diameter, a container secured to said housing, a cover for said container, a rotary beater knife in said container and coupled to said motor, a press contact switch in said housing in circuit with said motor for operating the same, the contacting elements of the switch being located on the inside of said housing and in line with said aperture in the housing, a downwardly projecting resilient tongue terminating at its lower end with a stud, said stud being a least partly in said aperture when said cover is properly in position on said container, said tongue being adapted to be pressed to cause said stud to engage said contacting element whereby said elements are closed and said electric circuit completed.

References Cited in the file of this patent

FOREIGN PATENTS

| | | |
|---|---|---|
| 505,139 | Italy | Dec. 16, 1954 |
| 1,008,457 | Germany | Jan. 3, 1957 |
| 1,078,637 | France | May 12, 1954 |
| 1,106,248 | France | July 13, 1955 |